US012726878B2

(12) United States Patent
Wang et al.

(10) Patent No.: US 12,726,878 B2
(45) Date of Patent: Sep. 1, 2026

(54) ADAPTIVE SWITCHING AND FUSION METHOD BASED ON BLUETOOTH INTERCOM AND CLOUD INTERCOM

(71) Applicant: Shenzhen Asmax Infinite Technology Co., Ltd., Shenzhen (CN)

(72) Inventors: Peng Wang, Shenzhen (CN); Cheng Luo, Shenzhen (CN); Xiaohong Zhang, Shenzhen (CN)

(*) Notice: Subject to any disclaimer, the term of this patent is extended or adjusted under 35 U.S.C. 154(b) by 421 days.

(21) Appl. No.: 18/582,861

(22) Filed: Feb. 21, 2024

(65) Prior Publication Data

US 2024/0306070 A1 Sep. 12, 2024

(30) Foreign Application Priority Data

Mar. 10, 2023 (CN) ......................... 202310225955.6

(51) Int. Cl.

*H04W 12/08* (2021.01)
*H04W 8/00* (2009.01)
*H04W 8/18* (2009.01)
*H04W 12/041* (2021.01)
*H04W 40/02* (2009.01)
*H04W 40/24* (2009.01)
*H04W 84/18* (2009.01)

(52) U.S. Cl.

CPC ......... *H04W 40/02* (2013.01); *H04W 40/248* (2013.01); *H04W 84/18* (2013.01)

(58) Field of Classification Search

None

See application file for complete search history.

(56) References Cited

U.S. PATENT DOCUMENTS 11,070,467 B1 * 7/2021 Shukla .................. H04W 8/005
11,431,561 B2 * 8/2022 Smith ................. G06F 16/1824
11,445,432 B2 * 9/2022 Ghessassi ............. H04W 48/16
11,743,695 B2 * 8/2023 Amini ..................... G01S 19/46 370/338
2018/0007628 A1 * 1/2018 Amorim de Faria Cardote .......... H04W 52/0212
2019/0342147 A1 * 11/2019 O'Reirdan .......... H04L 41/0668
2023/0239765 A1 * 7/2023 Bahrami ............... H04W 40/32 370/329

* cited by examiner

*Primary Examiner* — Pablo N Tran

(57) ABSTRACT

An adaptive switching and fusion method based on Bluetooth intercom and cloud intercom is disclosed, including, establishing a Mesh voice network; establishing a shadow chat network at a server in a cloud network; detecting online statuses of all the Mesh nodes in real time, and updating the online statuses of the Mesh nodes in the server in the real time; in response to a Mesh node being lost, uploading information of the Mesh node being lost by other Mesh nodes that are not lost to the server, where other Mesh nodes that are not lost simultaneously upload voice data of themselves to the server via the cloud network; mixing received voice data by the server, and issuing mixed voice data to the Mesh node being lost. The method of the present disclosure can smoothly switch the voice transmission channel and maintain the real-time performance and integrity of voice data transmission.

8 Claims, 4 Drawing Sheets

ADAPTIVE SWITCHING AND FUSION METHOD BASED ON BLUETOOTH INTERCOM AND CLOUD INTERCOM

TECHNICAL FIELD

The present disclosure relates to the technical field of wireless communication technology, and more specifically to an adaptive switching and fusion method based on Bluetooth intercom and cloud intercom.

BACKGROUND

In existing technologies, Bluetooth intercom technology is widely used in various fields, such as security intercom field, automotive cross-country call field, outdoor engineering command filed and other small range of communication field. Intercom devices establish a voice network through a mesh mechanism to achieve real-time intercom function and achieve transmission of voice data in coverage of Bluetooth signals.

Due to the blocking of buildings, large and small hillsides and other obstacles in scenes where the intercom devices are used as well as signal interference in their respective bands, both strength and reception sensitivity of Bluetooth signals are affected by different use scenarios, intermittent often appears, affecting real-time and coherent integrity of voice data transmission. For an existing mesh voice network, when a node is disconnected, voice data of other nodes is lost, so voice communication can only be maintained in respective sub-mesh networks, and the lost node cannot receive or send upstream and downstream voice data of itself, which affects the voice data transmission between all other nodes and the lost node, thus affecting experience of the use of the Bluetooth intercom device and failing to realize the coherent communication function.

In view of shortcomings of the existing technologies, it is urgent to propose an intercom fusion technology that can maintain the real-time and coherent integrity of voice data transmission to overcome the above problems.

SUMMARY

Embodiments of the present disclosure aims to provide an adaptive switching and fusion method based on Bluetooth intercom and cloud intercom, which is capable of smoothly switching voice transmission channels and maintaining real-time and coherent integrity of voice data transmission.

Objectives of the present disclosure are realized by adopting following technical solutions. Specifically, in some embodiments of the present disclosure, an adaptive switching and fusion method based on Bluetooth intercom and cloud intercom is provided, including operations of 101 to 105.

101, establishing a Mesh voice network by using a Bluetooth Mesh network mechanism, herein the Mesh voice network includes a plurality of Mesh nodes, and establishing a shadow chat network at a server in a cloud network, herein nodes of the shadow chat network are in one-to-one correspondence with the plurality of Mesh nodes of the Mesh voice network.

102, detecting in real time on-net statuses of the plurality of Mesh nodes of the Mesh voice network, and updating in real time the on-net statuses of the plurality of Mesh nodes in the server in the cloud network.

103, uploading information of a Mesh node being lost by other Mesh nodes that are not lost to the server via the cloud network in response to the Mesh node being lost, herein the other Mesh nodes that are not lost simultaneously upload voice data of themselves to the server via the cloud network.

104, mixing received voice data by the server, and issuing mixed voice data to the Mesh node being lost via the cloud network according to the one-to-one correspondence of the shadow chat network.

105, still transmitting voice data between the other Mesh nodes that are not lost within the Bluetooth Mesh network via the Mesh voice network.

In some preferred embodiments of the present disclosure, operation 101 further includes, allocating a network_id by the Mesh network to each Mesh node after the Mesh voice network is established, herein the each Mesh node has a same network_id, and the each Mesh node carries information of the network_id to send a request to the server via the cloud network to enter the shadow chat network that is established, and a room number of the shadow chat network is the network_id.

In some preferred embodiments of the present disclosure, operation 103 further includes, enabling, by one of the other Mesh nodes that are not lost, voice sampling channels of the cloud network; uploading the voice data of itself to the server via the cloud network; and transmitting voice data of itself to the Mesh voice network for receiving by other Mesh nodes that are not lost except itself.

In some preferred embodiments of the present disclosure, operation 104 further includes, combing, by the server, the voice data that is received; mixing the voice data sent by different nodes simultaneously in response to the different nodes sending voice data simultaneously; and issuing the voice data that is mixed; and issuing current voice data directly in response to no different nodes sending voice data simultaneously.

In some preferred embodiments of the present disclosure, operation 105 further includes, receiving, by the other Mesh nodes that are not lost, voice data from the Mesh voice network and voice data from the cloud network simultaneously, and mixing the voice data from the Mesh voice network and the voice data from the cloud network for playing.

In some preferred embodiments of the present disclosure, each Mesh node keeps heartbeats with the server after the shadow chat network is established, the server issues information of a Mesh node being offline to other Mesh nodes in response to detect that a plurality of heartbeats of the Mesh node are overtime. The other Mesh nodes re-determine the information of the Mesh node being lost and report it to the server, and then determine whether to upload voice data of themselves to the server via the cloud network according to latest information of the Mesh node being lost.

In some preferred embodiments of the present disclosure, after the shadow chat network is established, in response to a node being actively lost, other nodes that are not lost report information of the node being actively lost to the server, the server marks the node that is actively lost as a leaving state and pushes marking information to the other nodes that are not lost, and the other nodes that are not lost do not need to upload voice data of themselves to the server via the cloud network and continue to transmit the voice data within the mesh voice network; and in response to the node that is actively lost returning, the node that is actively lost re-joins the shadow chat network, the server issues information of the node re-joining to the other nodes that are not lost, and the other nodes that are not lost wait for the node that is actively lost to re-join the Mesh voice network.

In some preferred embodiments of the present disclosure, the cloud network includes a 3G network, a 4G network or a 5G network.

In the embodiments of the present disclosure, online situations of the Mesh network nodes are obtained in real time, and it is smoothly switched to the cloud network for voice data transmission when a Mesh node is lost, so as to ensure normal voice data transmission and reception of the lost node, and to achieve the effect of smooth and unhindered experience. The Mesh nodes that are not lost continue to adopt the Mesh network for voice data transmission among themselves, and the cloud network transmission is used as a backup channel when nodes are lost, and the channel is enabled at the right time to ensure the stability and integrity of the voice data transmission. The shadow chat network of each node is established in the cloud network, the cloud server forwards the voice data of each node according to the situation of the mesh node being lost, which ensures the normal transmission of voice data under the state of the node being lost, and achieves the effect of real-time online and uninterrupted transmission of voice data of all the nodes.

DETAILED DESCRIPTION OF THE EMBODIMENTS

Figure 1:
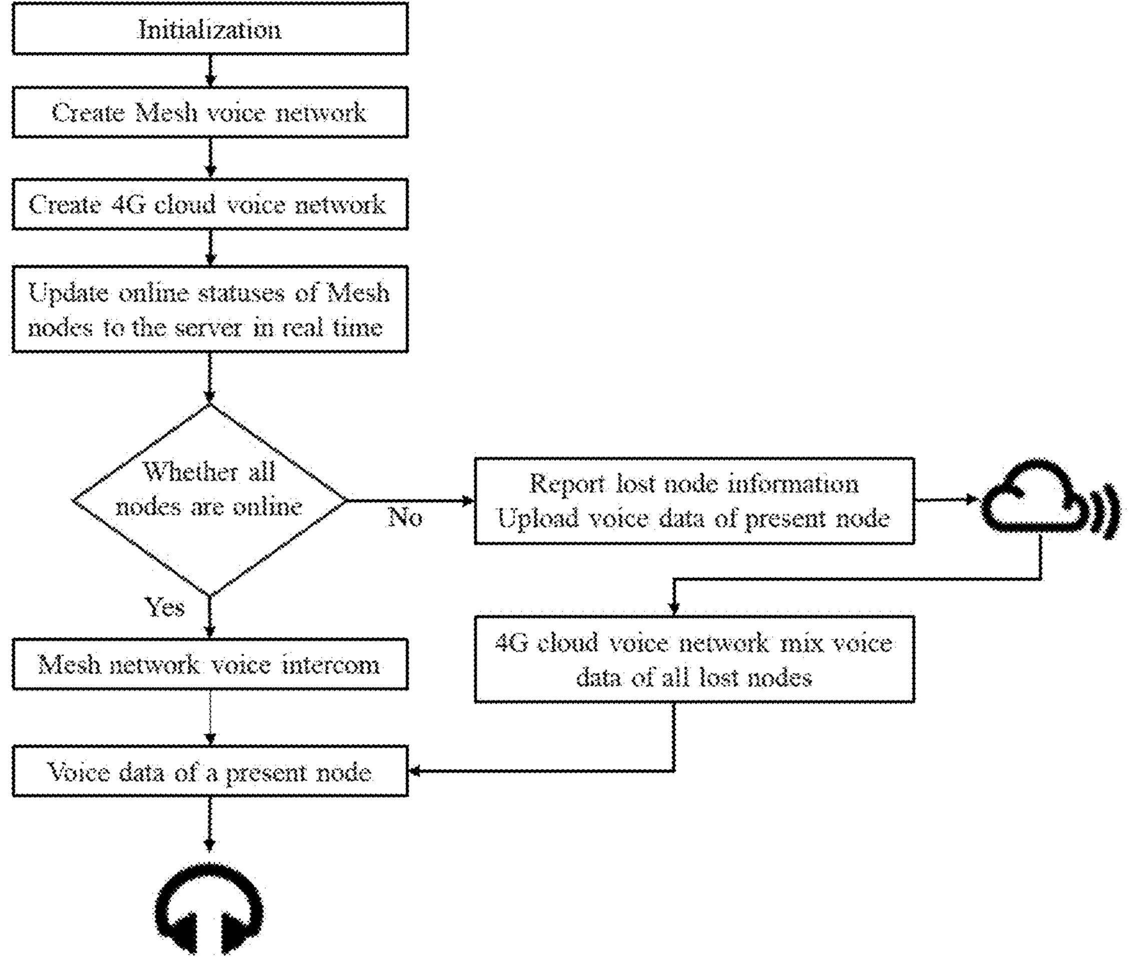
FIG. 1 is a flowchart of an adaptive switching and fusion method based on intercom using 4G in accordance with some embodiments of the present disclosure.

In order to make objectives, technical solutions, and advantages of the present disclosure clearer, the present disclosure is further described in detail below with reference to the accompanying drawings and embodiments. It should be understood that specific embodiments described herein are merely used to explain the present disclosure and are not intended to limit the present invention.

Specific implementations of the present disclosure are described in detail below with reference to specific embodiments. Note that the term "node" refers to a Mesh node unless otherwise specified, or is defined according to the context.

In some embodiments of the present disclosure, an adaptive switching and fusion method based on Bluetooth intercom and cloud intercom is provided, including following operations 101 to 105.

101, establishing a Mesh voice network by using a mechanism of a Bluetooth Mesh network, herein the Mesh voice network includes a plurality of Mesh nodes; and establishing a shadow chat network at a server in a cloud network, herein nodes of the shadow chat network are in one-to-one correspondence with the plurality of Mesh nodes of the Mesh voice network.

In some embodiments of the present disclosure, after the Mesh voice network is established, the Mesh network allocates a network_id to each Mesh node, the each Mesh node has the same network_id, and the each Mesh node carries information of the network_id to send a request to the server via the cloud network to enter the shadow chat network that is established. And a room number of the shadow chat network is the network_id.

102, detecting in real time online statuses of the plurality of Mesh nodes of the Mesh voice network, and updating in real time the online statuses of the plurality of Mesh nodes in the server in the cloud network.

103, in response to a Mesh node being lost, uploading, by other Mesh nodes that are not lost, information of the Mesh node being lost to the server via the cloud network, herein the other Mesh nodes that are not lost simultaneously upload voice data of themselves to the server via the cloud network.

In some embodiments of the present disclosure, one of the other Mesh nodes that are not lost enables voice sampling channels of the cloud network and uploads the voice data of itself to the server via the cloud network, and at the same time, transmits the voice data of itself to the Mesh voice network for receiving by other Mesh nodes that are not lost except itself.

104, mixing, by the server, the voice data that is received, and issuing mixed voice data to the Mesh node being lost via the cloud network according to the one-to-one correspondence of the shadow chat network.

In some embodiments of the present disclosure, the server combs the received voice data. In response to different nodes sending voice data simultaneously, the server mixes the voice data sent by the different nodes simultaneously and issues the mixed voice data. In response to no different nodes sending the voice data simultaneously, the server directly issues the current voice data.

105, still transmitting voice data between the other Mesh nodes that are not lost within the Bluetooth Mesh network via the Mesh voice network.

In some embodiments of the present disclosure, the other Mesh nodes that are not lost receive voice data from the Mesh voice network and voice data from the cloud network simultaneously, and then mix the voice data from the Mesh voice network and the voice data from the cloud network for playing.

In some embodiments of the present disclosure, after the shadow chat network is established, each node keeps heart beating with the server, the server issues information of a node being offline to other nodes in response to detecting that a plurality of times of heartbeat of the node are overtime. The other nodes re-determine the information of the Mesh node being lost to report it to the server, and then determine whether to upload voice data of themselves to the server via the cloud network according to latest information of the Mesh node being lost.

In some embodiments of the present disclosure, after the shadow chat network is established, in response to a node being actively lost, other nodes that are not lost report information of the node being actively lost to the server, the server marks the node that is actively lost as a leaving state and pushes marking information to the other nodes that are not lost, and the other nodes that are not lost do not need to upload voice data of themselves to the server via the cloud network and continue to transmit the voice data within the mesh voice network; and in response to the node that is actively lost returning, the node that is actively lost re-joins the shadow chat network, the server issues information of the node re-joining to the other nodes that are not lost, and the other nodes that are not lost wait for the node that is actively lost to re-join the Mesh voice network.

In some embodiments of the present disclosure, the cloud network includes a 3G network, a 4G network, or a 5G network.

As shown in FIG. 1, it shows a flowchart of an adaptive switching and fusion method based on intercom using 4G in accordance with some embodiments of the present disclosure. Herein taking the cloud network being the 4G network as an example, and an adaptive switching and fusion method for intercom is as follows.

a. A chat network is established by using a mechanism of a Bluetooth Mesh network. That is, establishing a Mesh voice network. At the same time, a shadow chat network is established at a server. That is, establishing a 4G cloud voice network.

b. Statuses of Mesh nodes are updated to the server in real time, and when one or more nodes leave the network (i.e., not in the network), lost nodes are reported to the server, and voice data of a present node starts to be uploaded to the server through the 4G at the same time.

c. The 4G cloud voice network mixes voice data of all the lost nodes, and the server transmits the voice data lacking the node through 4G channels. The server mixes voice data of the lost nodes according to data of all nodes with which each node loses connections, and issues the mixed voice data to corresponding lost nodes, so as to achieve the effect that these nodes do not leave the network.

d. Nodes in the Mesh network which are not lost still transmit voice data through Mesh.

Figure 2:
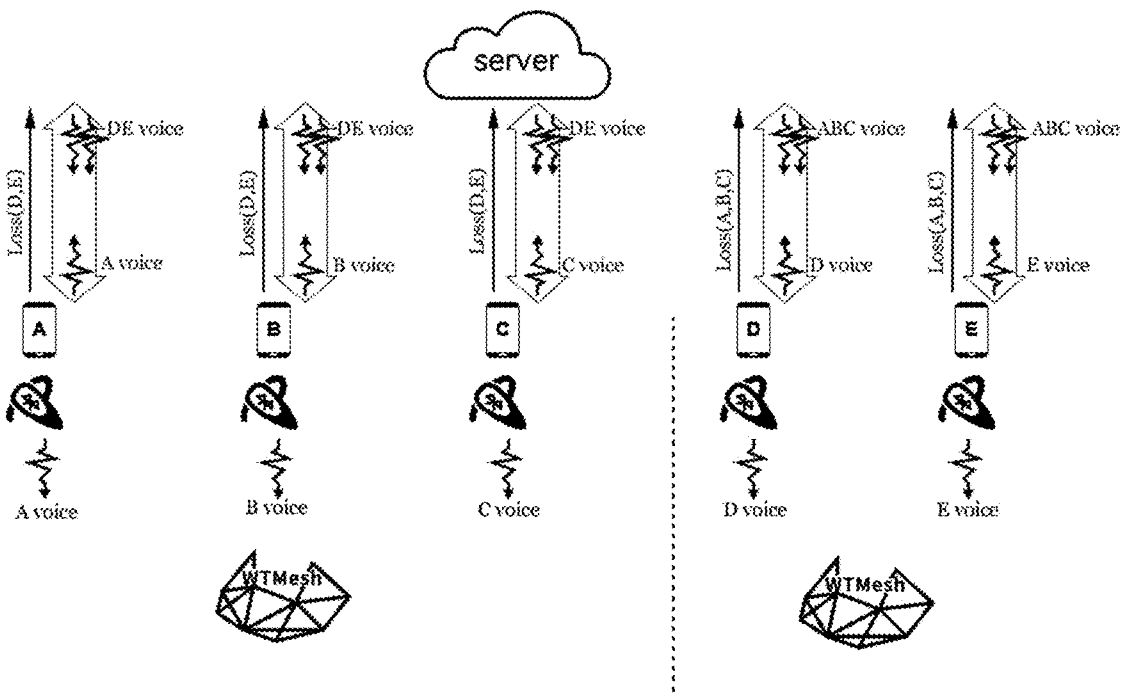
FIG. 2 is a schematic diagram of voice data transmission between Mesh networking and cloud networking in accordance with some embodiments of the present disclosure.

As shown in FIG. 2, it shows a schematic diagram of voice data transmission between Mesh networking and cloud networking in accordance with some embodiments of the present disclosure. Herein a WT network represents the Mesh network, and an AWT network represents the cloud network. The device (node) can obtain online conditions of members in the WT network in real time, voice messages are only sent via the WT network when all the members are online, and the AWT network remains connected but does not sample the voice. When the device detects that a member in the WT network is disconnected from itself, the device sends a loss list to an APP, and the APP reports the loss list to the cloud. Meanwhile, the device requests the APP to enable AWT voice sampling channels, and sends its own voice to the WT network and the AWT network. The cloud receives voice from each device, and only sends voice packets of members in the loss list to each device through the AWT according to the loss list of each device. Voice packets of other devices that are not lost are still received on the WT network. If voice packets of two or more members are sent at the same time on the AWT network, voice mixing needs to be performed at the cloud or the APP. If the device receives the voice from the AWT network and the WT network at the same time, voice mixing needs to be performed locally on the device.

In FIG. 2, five members A, B, C, D, and E are networked, D and E are spaced apart from A, B, and C, so that the WT network (WTMesh network) is divided into two parts, where D and E can be connected to each other, A, B and C can be connected to each other, but D and E are disconnected from A, B, and C.

When the A, B, and C find that D and E are lost, they report Loss (D, E) to the cloud server (i.e., Server shown in the figure). Similarly, when D and E find that the A, B, and C are lost, they report Loss (A, B, C) to the cloud server.

Since each of the A, B, C, D, and E has a member disconnected from itself, they need to enable AWT voice channels at the cloud and send their own voice to the WT network and the AWT network at the same time.

Taking A as an example, voices from A, B, C, D, and E are received, and the cloud determines that a loss list of the A includes D and E, so that the voices of D and E are sent to A through the AWT channels of the cloud network. Similarly, the voices of D and E are also sent to B and C, and D and E receive the voices of A, B and C from the cloud (if the voices are generated at the same time, the voices need to be mixed and then issued).

Finally, A receives the voices of D and E from the AWT network (the D Voice and the E Voice in the figure), receives the voices of B and C from the WT network, and mixes the voices locally for playing. The process is similar to that of B, C, D and E devices.

When the cloud network may be offline, the device needs to keep heartbeats after entering a room of the shadow chat network and before leaving the room of the shadow chat network. When the cloud detects that a plurality of heartbeats are overtime, it is determined that the device is offline on the cloud network. When the cloud finds the device is offline, it sends an offline notification to other devices, which carries a parameter 'case=offline'. After receiving the notification, the device re-determines the Loss list to report to the cloud, and decides whether to use the AWT voice channel accordingly.

Figure 3:
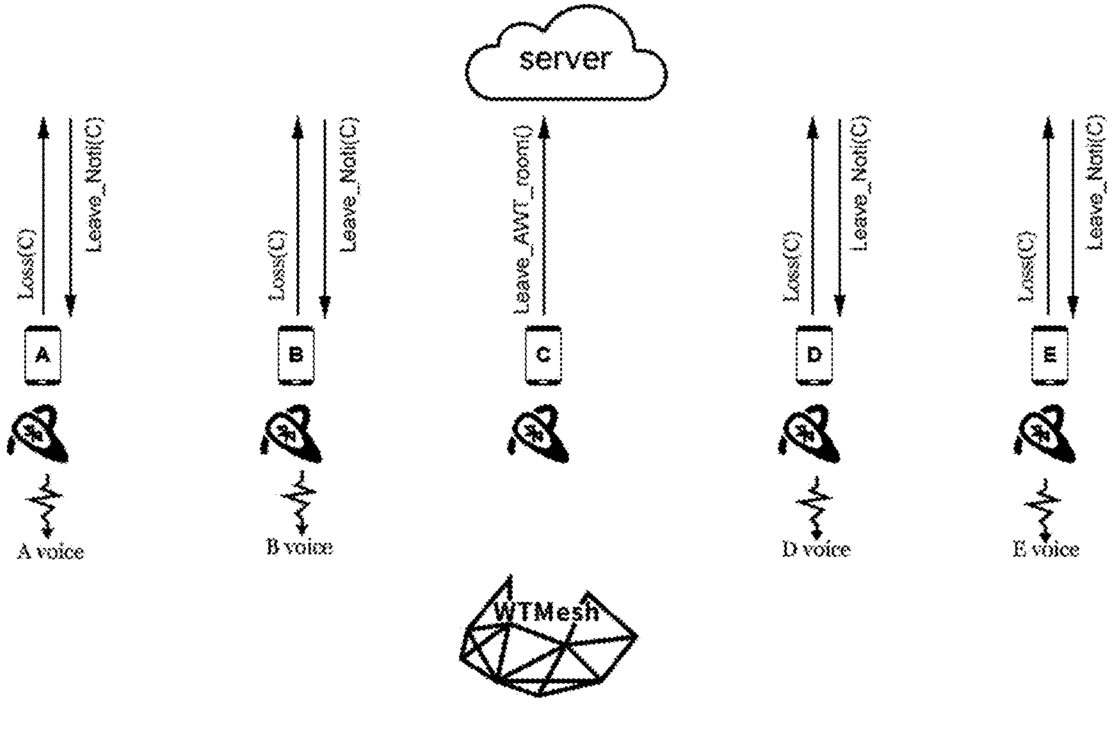
FIG. 3 is another schematic diagram of voice data transmission between Mesh networking and cloud networking in accordance with some embodiments of the present disclosure.

As shown in FIG. 3, it shows another schematic diagram of voice data transmission between Mesh networking and cloud networking in accordance with some embodiments of the present disclosure. Herein an active offline situation of the device may be that the device is preempted by an incoming call, a user actively switches to other intercom teams, or the user actively exits the team intercom. The device that switches the network reports the Leave_AWT_room to the cloud, and requests with enter_AWT_room (network_id) to enter again when returning.

As an example, A, B, C, D and E are networked, during which C switches to other teams on halfway.

The A, B, D and E finds that C is lost and reports Loss (C) to the cloud. C reports Leave_AWT_Room to the cloud, and the cloud marks C as a leaving state. The cloud pushes a leaving event Leave_Noti (C) of C to A, B, D and E, so that A, B, D and E do not enable the AWT voice channel and still uses the WT network for communication.

After returning to the team, C reports enter_AWT_room (network_id) to the cloud, and the cloud pushes a returning event Enter_Noti (C) of C to the A, B, D and E. A, B, D and E waits for C to be online on the WT network, if the waiting times out, it is determined that C is lost in the WT network, and then a method of voice data transmission between C and A, B, D and E is the same as the method used for the lost node.

The content shown in the FIG. 3 is in an ideal situation, and in actual operation, the push may delay, and A, B, D and E may actively query the device in a the leave state a few times from the cloud after A, B, D and E find that the C is offline, and then determine whether to enable the AWT channel.

For example, in a state in which the AWT channel has been enabled, the device should re-determine whether the member is online on the WT network after receiving a Leave_Noti message, and update the Loss list to the cloud.

Figure 4:
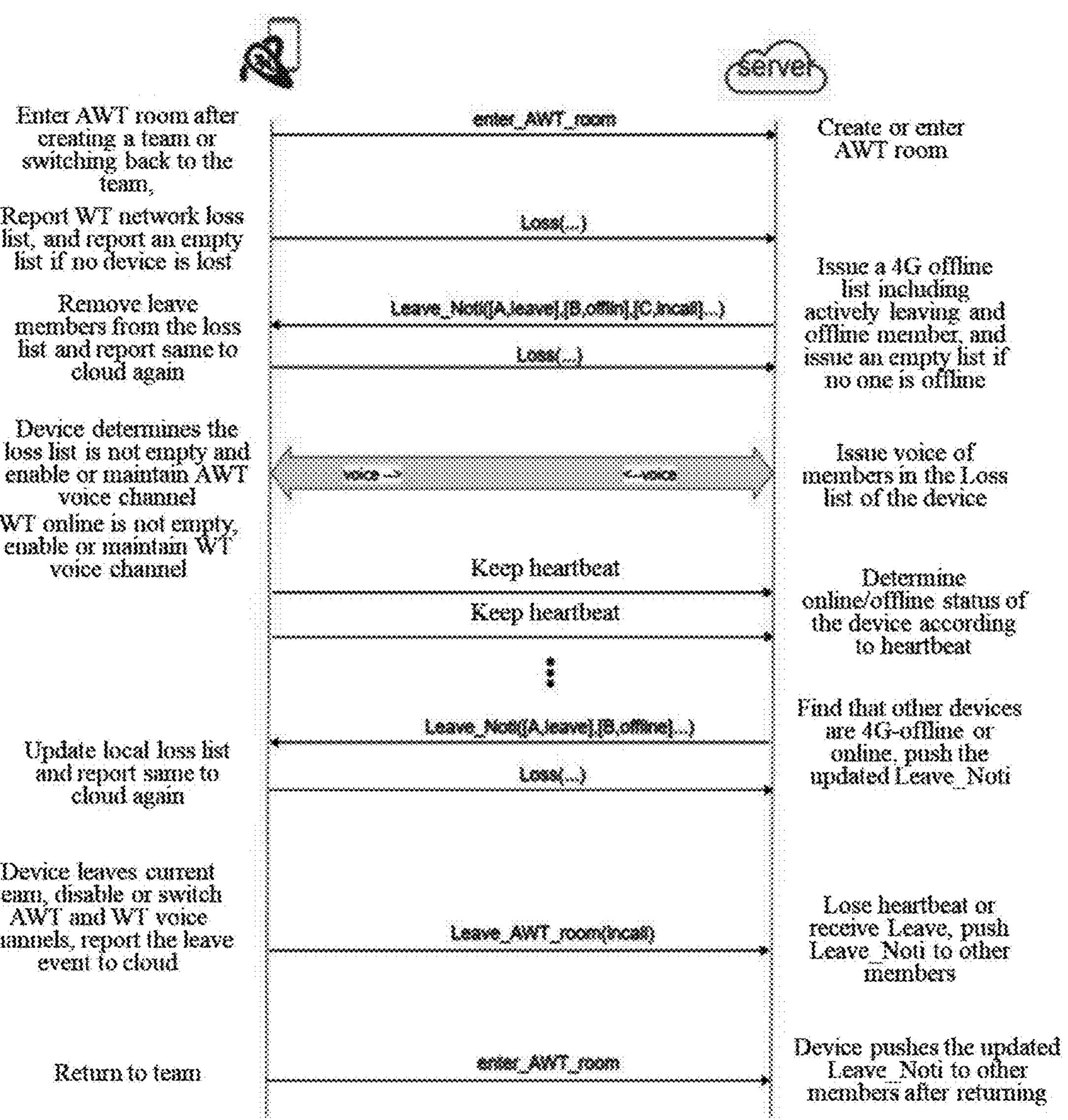
FIG. 4 is a schematic diagram of message interaction between a cloud server and a device in accordance with some embodiments of the present disclosure.

As shown in FIG. 4, it shows a schematic diagram of message interaction between a cloud server and a device in accordance with some embodiments of the present disclosure.

After establishing a team or returning to the team, the device enters an AWT chat room and sends a request for entering the chat room to the cloud server, and the cloud server establishes or allows the device to enter the AWT chat room according to the request.

The device reports a lost list of the WT network to the cloud server in real time, such as an empty list if no device is lost. The cloud server issues a 4G offline list in real time, including an active leave list and an offline list, such as an empty list if there is no device offline. The device removes leave members from the lost list and reports the lost list to the cloud server again.

If the device determines that the lost list is not empty, the AWT voice channel is enabled or maintained, and if the device determines that a WT online list is not empty, the WT voice channel is enabled or maintained. The cloud server issues voices of the members in the lost list.

Heartbeats are maintained between the device and the cloud server, and an online or offline state of the device is determined according to the heartbeats. If other devices are found to be 4G-offline or online, the updated leave list is pushed to the device, and the device updates a local lost list and reports the same to the cloud server again.

When the device leaves a current team, the AWT voice channel and the WT voice channel are turned off or switched, the leave event of the device is reported to the cloud server, and the cloud server determines that the heartbeat is lost or information of the leave event is received and pushes the information of the leave event to other members.

If the device returns to the team and requests to enter the AWT chat room, the cloud server pushes the updated information of the leave event to other members.

In the current communication environment, 4G communication has a large coverage distance and stable signal, which is suitable for use as an auxiliary. In some embodiments of the present disclosure, after the Mesh network is disconnected, the node keeps receiving the voice data of other nodes through 4G, which can expand the coverage of the Mesh chat network and enhance a chat communication range.

The cloud communication in the present disclosure may also be a 3G or 5G communication technology, which can also realize the function of the 4G communication, and basic principles of the communication are similar, which are not described herein again.

In conclusion, the adaptive switching and fusion method for Bluetooth intercom and cloud intercom of the present disclosure, obtains the online situations of the Mesh network nodes in real time, and smoothly switches to the cloud network to transmit the voice data when the Mesh network nodes are lost, so as to ensure normal voice data transmission and reception of the lost nodes, thereby achieving a smooth experience effect. The Mesh network nodes that are not lost continue to use the Mesh network to transmit the voice data, and the other nodes that are not lost still maintain the original connection without greatly increasing the information processing burden of the device, thereby providing a flexible voice information transmission mode.

The cloud network transmission is used as a standby channel when the nodes are lost, and the channel is enabled timely to ensure the stability and integrity of voice data transmission. By establishing the shadow chat network of each node in the cloud network, the cloud server forwards the voice data of each node according to the loss of the Mesh network node, thereby ensuring the normal transmission of the voice data of the node in the lost state, and achieving the effect of online uninterrupted transmission of the voice data by all nodes in real time.

The above description is merely preferred embodiments of the present disclosure and is not intended to limit the present disclosure. Any modifications, equivalent replacements, improvements, etc. made within the spirit and principle of the present disclosure shall fall within the protection scope of the present invention.

What is claimed is:

1. An adaptive switching and fusion method based on Bluetooth intercom and cloud intercom comprising operations of, establishing a Mesh voice network by using a mechanism of a Bluetooth Mesh network, wherein the Mesh voice network comprises a plurality of Mesh nodes, and establishing a shadow chat network at a server in a cloud network, wherein nodes of the shadow chat network are in one-to-one correspondence with the plurality of Mesh nodes of the Mesh voice network;

detecting in real time online statuses of the plurality of Mesh nodes of the Mesh voice network, and updating in real time the online statuses of the plurality of Mesh nodes in the server in the cloud network;

uploading information of a Mesh node being lost by other Mesh nodes that are not lost to the server via the cloud network in response to the Mesh node being lost, wherein the other Mesh nodes that are not lost simultaneously upload voice data of themselves to the server via the cloud network;

mixing received voice data by the server, and issuing mixed voice data to the Mesh node being lost via the cloud network according to the one-to-one correspondence of the shadow chat network; and still transmitting voice data between the other Mesh nodes that are not lost within the Bluetooth Mesh network via the Mesh voice network.

2. The adaptive switching and fusion method based on Bluetooth intercom and cloud intercom according to claim 1, wherein the operation 101 further comprises, allocating a network_id by the Mesh voice network to each Mesh node after the Mesh voice network is established; and wherein the each Mesh node has a same network_id, and the each Mesh node carries information of the network_id to send a request to the server via the cloud network to enter the shadow chat network that is established; and a room number of the shadow chat network is the network_id.

3. The adaptive switching and fusion method based on Bluetooth intercom and cloud intercom according to claim 1, wherein the operation 103 further comprises, enabling, by one of the other Mesh nodes that are not lost, voice sampling channels of the cloud network;

uploading the voice data of itself to the server via the cloud network; and transmitting voice data of itself to the Mesh voice network for receiving by other Mesh nodes that are not lost except itself.

4. The adaptive switching and fusion method based on Bluetooth intercom and cloud intercom according to claim 1, wherein the operation 104 further comprises, combing, by the server, the voice data that is received;

mixing voice data sent by different nodes simultaneously in response to the different nodes sending voice data simultaneously, and issuing the voice data that is mixed; and issuing current voice data directly in response to no different nodes sending voice data simultaneously.

5. The adaptive switching and fusion method based on Bluetooth intercom and cloud intercom according to claim 1, wherein the operation 105 further comprises, receiving, by the other Mesh nodes that are not lost, voice data from the Mesh voice network and voice data from the cloud network simultaneously; and mixing the voice data from the Mesh voice network and the voice data from the cloud network for playing.

6. The adaptive switching and fusion method based on Bluetooth intercom and cloud intercom according to claim 1, wherein each Mesh node keeps heartbeats with the server after the shadow chat network is established, the server issues information of a Mesh node being offline to other Mesh nodes in response to detect that a plurality of heartbeats of the Mesh node are overtime; and wherein the other Mesh nodes re-determine the information of the Mesh node being lost and report it to the server, and then determine whether to upload voice data of themselves to the server via the cloud network according to latest information of the Mesh node being lost.

7. The adaptive switching and fusion method based on Bluetooth intercom and cloud talkback according to claim 1, wherein after the shadow chat network is established, in response to a node being actively lost, other nodes that are not lost report information of the node being actively lost to the server, the server marks the node that is actively lost as a leaving state and pushes marking information to the other nodes that are not lost, and the other nodes that are not lost do not need to upload voice data of themselves to the server via the cloud network and continue to transmit the voice data within the mesh voice network; and in response to the node that is actively lost returning, the node that is actively lost re-joins the shadow chat network, the server issues information of the node re-joining to the other nodes that are not lost, and the other nodes that are not lost wait for the node that is actively lost to re-join the Mesh voice network.

8. The adaptive switching and fusion method based on Bluetooth intercom and cloud talkback according to claim 1, wherein the cloud network comprises a 3G network, a 4G network, or a 5G network.

* * * * *